May 21, 1968  G. FENET  3,384,038
LIQUID FERTILIZER APPLICATOR FOR A PLOW
Filed Sept. 30, 1966
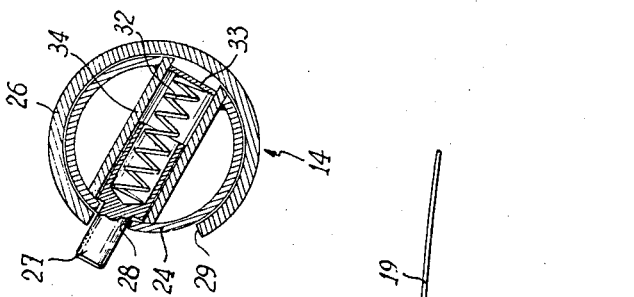
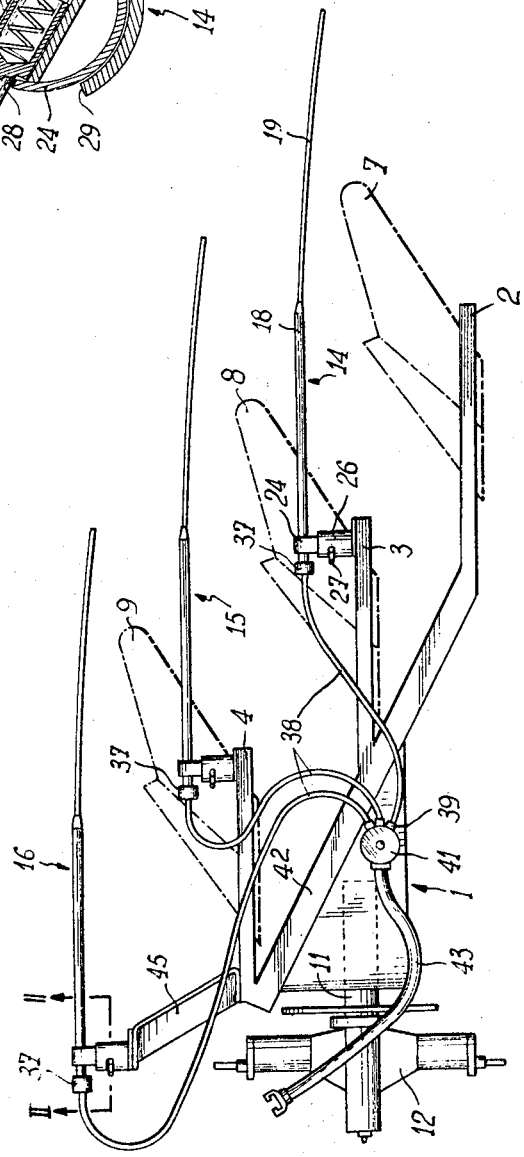
INVENTOR
GILBERT FENET

United States Patent Office 3,384,038
Patented May 21, 1968

3,384,038
LIQUID FERTILIZER APPLICATOR FOR A PLOW
Gilbert Fenet, Bergueneuse-par-Heuchin, France, assignor to Societe Anonyme des Etablissements Fenet, Bergueneuse-par-Heuchin, Pas-de-Calais, France
Filed Sept. 30, 1966, Ser. No. 583,400
Claims priority, application France, Oct. 5, 1965, 33,835
10 Claims. (Cl. 111—6)

This invention relates, in general, to the construction of agricultural machinery and, in particular, to a new and useful device for distributing a liquid fertilizer such as ammonia in association with means for plowing furrows.

The present invention is an improvement over the prior art particularly in respect to the mounting and arrangement of lances for the discharge of a liquid fertilizer into a furrow which is opened by a plow share associated with the apparatus. The invention provides means for distributing the liquid fertilizer to the associated furrow without requiring a selective feeding to one or more lances which are associated with the same number of plow shares.

In accordance with the invention, there is provided a machine which includes a frame mounting a plurality of plow shares in side-by-side relationship which are advantageously alternately brought into a working position and into a raised position by the simultaneous swinging of the beam. In accordance with the invention, a distributing lance for each plow share is arranged on the frame so that the trailing ends of the lanes are directed backwardly to orient the discharge thereof directly over a furrow which is being opened up by one of the plow shares. The lances are advantageously constructed so that their outer ends are very flexible and will extend downwardly under the influence of gravity to the vicinity of the tip of the associated plow share.

The device advantageously includes a feed system for connecting each of a plurality of lances to a source of liquid fertilizer such as ammonia through a common distributor head. The lances are individually mounted in sockets, preferably on the frame elements which carry a plow share and the trailing discharge ends are oriented over the next adjacent plow share for discharging into the furrow created thereby. All of the lances are mounted so that they may be pivoted to orient their discharge in a selected location and they are also mounted so that they may be removed from their socket mounting together with their distributor head and connecting lines if so desired. In the preferred arrangement, each rigid lance terminates in a flexible extension piece made of natural or synthetic rubber so that its outer discharge end will bend downwardly. The individual socket mountings for each lance is such that the lance may be latched into position or they may be easily removed from the socket. In addition, they may be pivoted as desired within a slight pivotal range of a socket. Each lance carries a shaft member which pivots in the socket and which is equipped with a retractable spring catch which will engage in a curved slot formed in the outer cylindrical surface of the socket. The two ends of the slot define abutments which limit the pivotal movement of the lance.

Accordingly, it is an object of the invention to provide a device for facilitating the fertilizing of plowed furrows.

A further object of the invention is to provide a liquid fertilizer distributing system for a plow having a plurality of plow shares which includes means for mounting a discharging lance for the fertilizer o nthe frame of the plow share in a position at which its outer discharge end may be oriented directly over an associated plow share and including a supply conduit connection for a plurality of the liquid fertilizer discharging lances permitting separate fluid fertilizer flow to each of the lances without any selective feeding.

A further object of the invention is to provide a mounting for a plurality of fertilizer distribution lances on a plow share which includes a receiving socket and a lance member for discharging the fertilizer having a shaft which is adapted to be latched into the socket and to be mounted so that it may be pivoted within a desirable pivotal range.

A further object of the invention is to provide a device for fertilizing furrows which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a top plan view of a plow having a liquid fertilizer distribution system constructed in accordance with the invention;

FIG. 2 is an enlarged sectional view taken along the lines II—II of FIG. 1.

Referring to the drawings, in particular, the invention embodied therein comprises a reversible plow generally designated 1 having three double plow shares 7, 8 and 9 which are mounted on beams 2, 3 and 4, respectively, which are carried on a frame or body 42. The frame or body 42 is carried on a pole member or axle support 11 which can turn in a known manner in a support 12 which, in turn, is mounted on a three-point hitch system of a tractor. The support 12 is equipped with suitable mechanism (not shown) to ensure the pivoting of the pole 11 to permit swinging of the plow as desired.

In accordance with the invention, there is provided a liquid fertilizer distributing system for distributing a liquid fertilizer such as ammonia. The distribution system includes an individual lance assembly 14, 15 and 16 which is adapted to be associated with each respective plow share 7, 8 and 9. Each of the lances 14, 15 and 16 includes a rigid tube 18 which may be made of a material such as metal. In addition, it includes a flexible tube or end portion 19 made of a rubber or suitable plastic material which will normally bend downwardly under the influence of gravity.

In the arrangement indicated in FIG. 1, lance 14 is mounted on the frame 3 which carries the plow share 8 even though it is intended for use in orientation with the plow share 7. Similarly, the lance 15 is mounted on the frame 4 for use with the plow share 8 and the lance 16 is mounted on an extension or frame member 45 for association with the plow share 9.

A feature of the invention construction is that each of the lance assemblies carries a shaft portion or shaft member 24 which is secured to the rigid tube 18 against axial displacement and which includes a portion which is rotatably within a socket or tube 26 carried on the respective frame elements.

Each shaft 24 includes a latching member or catch 27 which also functions as a pivot limiter. The catch 27 includes a pin portion which extends through an opening 28 of the shaft portion 24 and rides in a curved groove or slot 29 defined in the socket 26. The pin 27 is urged outwardly by a spring 32 which rests against a disk or plate 33 carried at the inner end of the tube 34. The tube 34 is secured in the tubular shaft 24 and it provides means for accommodating the spring 24 with the latch 27. The pin 27 may be pushed inwardly or retracted to permit the shaft member 24 to be lifted out of the socket 26. In the position indicated in FIG. 2, the pin 27 provides a limit control for limiting the pivotal movement of the shaft member 24 with the associated lance to the end positions at which the pin 27 contacts the walls of the slot 29.

The inner end of each lance 14, 15 and 16 terminates in a ferrule 37 in which is mounted one end of a flexible tube 38. The flexible tube 38 of the lances are connected to snap-off coupling elements 39 on a branching box or distributor 41. The distributor 41, in turn, is connected such as by a quick disconnect coupling to a flexible tube 43 which is adapted to be connected to any convenient source of liquid fertilizer such as ammonia.

The operation of the ammonia distributing and plow-in device is very simple. Whichever of the two working positions of the reversible or quarter turn plow is effective, the lances will always be under the effect of gravity inclined downwardly to cause the deposit of the fertilizer in the furrow which the corresponding plow shares have just turned over. The arrangement is such, however, that no manipulation is required to control the distribution of the fertilizer to a particular lance as would be the case if a single lance were adapted to each of a plurality of plow shares.

It is very simple to remove each of the lances from the plow by depressing the pin 27 and lifting the associated shaft 24 of each lance upwardly out of the socket 26. When this is done, all of the lances together with their connecting conduits can be removed from the frame.

While a specific embodiment of the invention has been shown and described in detail to illustrate the application of the inventive principles, it will be understood that the invention may be embodied otherwise without departing from such principles.

What is claimed is:

1. A liquid fertilizer distributing device for use in association with a plow, comprising a plow frame having at least one plow share thereon, an elongated lance for each plow share providing for the flow of liquid fertilizer therethrough and including at least an end portion of resilient material which bends downwardly under the influence of gravity and terminates in a liquid discharge located over each associated plow share, and socket means on said plow frame for detachably pivotally mounting said lance.

2. A liquid fertilizer distributing device according to claim 1, wherein said socket means includes a cylindrical member carried on said frame, each of said lances having a shaft portion which is pivotal in said cylindrical member, and means for latching said shaft portion in said cylindrical member to hold said lance in position but to permit the pivotal movement thereof.

3. A liquid fertilizer distributing device, according to claim 2, wherein said latching means includes a pin carried by said shaft portion and engageable in a slot of said cylindrical portion, said pin being retractable to move out of the slot of said cylindrical portion to release said shaft with the associated lance.

4. A liquid fertilizer distributing device, according to claim 3, wherein said cylindrical portion includes a wall at each end of said slot defining abutment stops for limiting the pivotal movement of said shafts with the associated lance.

5. A liquid fertilizer distributing device, according to claim 1, wherein said end portion of said lance is made of a rubber material.

6. A liquid fertilizer distributing device, according to claim 1, wherein said socket means includes a shaft member affixed to said lance, and a cylindrical member affixed to said plow frame, said shaft member being rotatable within said cylindrical member.

7. A liquid fertilizer distributing device, according to claim 1, wherein said socket means includes a cylindrical member carried on said frame, said lance having a shaft member rotatable in said cylindrical member, a latch member associated with said shaft member including a pin engageable in a slot defined in said cylindrical member, said slot defining limits for the pivotal movement of said pin member with said shaft and said lance.

8. A liquid fertilizer distributing device, according to claim 1, including at least two plow shares on said plow frame arranged in spaced relationship for plowing up separate furrows, said lances being mounted on said frame in a position offset from the plow share with which it is to be associated, said discharge ends of said lances being oriented to extend from its mounting location transversely to the associated plow share to deposit the fertilizer in a furrow which is plowed thereby.

9. A liquid fertilizer distributing device, according to claim 8, including a distributor connected to a source of liquid fertilizer, and conduit means connected between said distributor and each of said lances, said distributor and said conduit means together with said lances being removable from said plow shares.

10. A liquid fertilizer distributing device, according to claim 9, wherein said conduit means connected between said distributor and said lances includes hoses having snap couplings.

References Cited

UNITED STATES PATENTS 2,988,025   6/1961   Johnston _____ 111—6

ROBERT E. BAGWILL, *Primary Examiner.*